(12) United States Patent
Valpard

(10) Patent No.: US 9,513,969 B2
(45) Date of Patent: Dec. 6, 2016

(54) METHOD FOR THE MANAGEMENT OF TASK EXECUTION IN A COMPUTER SYSTEM

(71) Applicant: SAGEM DEFENSE SECURITE, Boulogne Billancourt (FR)

(72) Inventor: Christian Valpard, Boulogne Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 14/401,018

(22) PCT Filed: May 14, 2013

(86) PCT No.: PCT/EP2013/059961
§ 371 (c)(1),
(2) Date: Nov. 13, 2014

(87) PCT Pub. No.: WO2013/171227
PCT Pub. Date: Nov. 21, 2013

(65) Prior Publication Data
US 2015/0169375 A1    Jun. 18, 2015

(30) Foreign Application Priority Data
May 15, 2012    (FR) ...................................... 12 54438

(51) Int. Cl.
*G06F 9/46* (2006.01)
*G06F 9/50* (2006.01)
*G06F 9/48* (2006.01)

(52) U.S. Cl.
CPC ........... *G06F 9/5038* (2013.01); *G06F 9/4881* (2013.01)

(58) Field of Classification Search
CPC .. G06F 9/4881; G06F 9/4843; G06F 9/45533; G06F 9/5033; G06F 9/52
See application file for complete search history.

(56) References Cited

U.S. PATENT DOCUMENTS 6,115,640 A * 9/2000 Tarumi ................... G06Q 10/06
  700/100
6,430,593 B1 * 8/2002 Lindsley ............... G06F 9/4812
  712/229

(Continued)

OTHER PUBLICATIONS

Lo Bello et al., "Overrun handling approaches for overload-prone soft real-time systems" *Advances in Engineering Software*, Elsevier Science, Oxford, GB vol. 38, No. 11-12, Jul. 27, 2007, pp. 780-794.

(Continued)

*Primary Examiner* — Lewis A Bullock, Jr.
*Assistant Examiner* — Tina Huynh
(74) *Attorney, Agent, or Firm* — Muncy, Geissler, Olds & Lowe, P.C.

(57) ABSTRACT

A method of managing execution of tasks by at least one processor unit of a computer system is provided, the processor unit operating in computation periods, and the method including the steps of associating time-related execution characteristics with each task, the time-related execution characteristics including a flag indicating the possibility of determining, a priori, a theoretical time for the end of the task in a nominal execution mode, and a flag indicating the possibility of an extended execution mode whereby execution can continue beyond the theoretical end-of-execution time. When a task is being executed at the theoretical end-of-execution time, an execution continuation algorithm is launched in the presence of the flag indicating the possibility of extended mode, or an error processing algorithm is launched in the absence of such a flag.

14 Claims, 1 Drawing Sheet

(56) References Cited

U.S. PATENT DOCUMENTS

2002/0138542 A1* 9/2002 Bollella ............... G06F 9/4887
 718/102
2012/0060063 A1* 3/2012 Sakurai ............... G06F 9/4406
 714/49

OTHER PUBLICATIONS

Buttazzo et al., "Adding Robustness in Dynamic Preemptive Scheduling" *Responsive Computer Systems: Steps Toward Fault-Tolerant Real-Time Systems*, Jan. 1, 1995, pp. 67-88.

Bougueroua et al., "An Execution Overrun Management Mechanism for the Temporal Robustness of Java Real-Time Systems" *Proceedings of the 4th International Workshop on Java Technologies for Real-Time and Embedded Systems*, JTRES 2006, Jan. 1, 2006, p. 188.

Buttazzo et al., "Handling execution overruns in hard real-time control systems" *IEEE Transactions on Computers, IEEE Service Center*, Los Alamitos, CA vol. 51, No. 7, Jul. 1, 2002 pp. 835-849.

\* cited by examiner

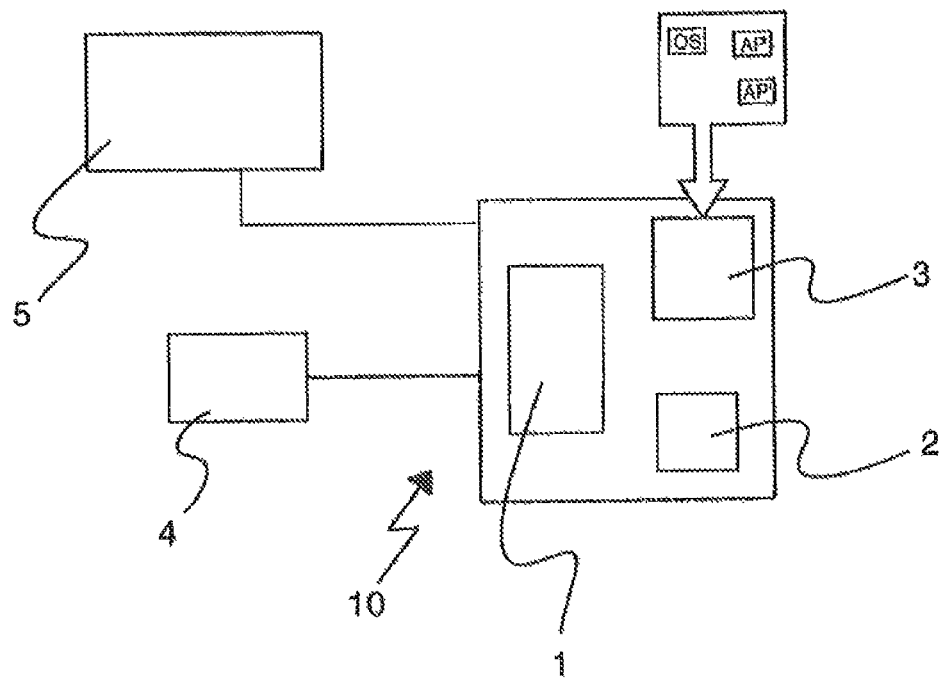

METHOD FOR THE MANAGEMENT OF TASK EXECUTION IN A COMPUTER SYSTEM

BACKGROUND OF THE INVENTION

1. Field of the Invention

The present invention relates to a method of managing execution of tasks by a computer system. The term "task" is used to designate a program or a portion of a program that is recorded in a memory of the computer system so as to be executed by a processor of said system.

2. Brief Discussion of the Related Art

Management of task execution is generally entrusted to a sequencer, which is a computer program of the operating system and which is in charge of ensuring that the tasks are executed properly. For example, the sequencer may be a real-time sequencer.

In certain uses, computer systems need to execute a certain number of tasks having run times, priorities and criticalities that are different. This is particularly complicated when critical tasks that are to be executed at precise times need to co-exist with non-critical tasks having relatively long run times. In addition, certain tasks have run times that vary.

One solution would be to provide, within the computer system, a plurality of processors dedicated to execution of certain tasks. However, such a solution is very costly and, in order to be reliable, requires the various processors to be under-used.

Another solution would be to subdivide the tasks that have long run times into sub-tasks in such a manner that a critical task can be executed between two sub-tasks. However, that involves significant software design constraints and considerably complicates the operations of modifying the tasks. In addition, that does not solve the problem of the tasks that have run times that vary.

The most commonly used solution is to make provision for time to be subdivided in such a manner as to define a succession of execution periods, some of which may be reserved for executing the most critical tasks. The tasks are then executed when they are of the highest priority. However, once more it is difficult to manage execution of the tasks that have run times that vary.

In conventional systems, computation periods (or "time slots") are defined during which the tasks are executed. When execution of a task is completed before the end of the computation period, the task remains in control and goes into a non-functional loop. The non-functional loop is interrupted at the end of the computation period when the sequencer takes over control in order to launch execution of another task. When execution of a task is not completed at the end of the computation period, the sequencer takes over control in order to launch an error processing algorithm. Having recourse to error processing consumes time and resources.

A method of managing overrun of execution time is known from Document US A 2002/0138542.

BRIEF SUMMARY OF THE INVENTION

An object of the invention is to provide means making it possible to manage task execution better, while also monitoring the timing of the tasks.

To this end, the invention provides a method of managing execution of tasks by at least one processor unit of a computer system, the processor unit operating in computation periods, and the method comprising the steps of:

associating time-related execution characteristics with each task, the time-related execution characteristics including a flag indicating the possibility of determining, a priori, a theoretical time for the end of the task in a nominal execution mode, and a flag indicating the possibility of an extended execution mode whereby execution can continue beyond the theoretical end-of-execution time; and when a task is being executed at the theoretical end-of-execution time, launching an execution continuation algorithm in the presence of the flag indicating the possibility of extended mode, or launching an error processing algorithm in the absence of such a flag.

By this method, the subdivision of time is improved by causing tasks to be deterministic in time. This makes it possible to manage overruns as well as possible, without any risk of interrupting a task that has overrun its theoretical end-of-execution time whenever no higher-priority task is to be executed after the task that is being executed. The extended execution mode thus makes it possible for the task to be finished, whereas interruption or error processing would make it necessary for the task to be carried out again subsequently. In addition, interruption of the task may have damaging consequences, e.g. when the computer system manages operation of machinery, such as a vehicle. This also makes it possible to limit use of error processing.

In various algorithms for execution in extended mode:
  execution is continued beyond the theoretical end time until, the task is actually finished;
  execution is continued to a predetermined time, and an error processing algorithm is launched if the execution is not completed at said predetermined time; and
  the number of executions already carried out in extended mode for each task is stored in a memory, and the execution is continued in the extended mode if the number of executions is less than a threshold, an error processing algorithm being launched if said number of executions is not less than said threshold.

The latter algorithm is particularly advantageous because it makes it possible to take account of previous executions of the task.

Advantageously, a plurality of execution continuation algorithms are stored in a memory, for execution in extended mode, and the time-related execution characteristics include an identifier for one of the execution continuation algorithms.

Other characteristics and advantages of invention appear on reading the following description of particular implementations of the invention.

BRIEF DESCRIPTION OF THE DRAWINGS

Reference is made to the accompanying sole FIGURE that is a diagram showing a computer system for implementing the method of the invention.

DETAILED DESCRIPTION OF THE PREFERRED EMBODIMENTS

With reference to the FIGURE, the method of the invention is implemented in a computer system that is given overall reference 10, and that, in a manner known per se, comprises a processor unit 1 provided with at least one processor, a read-only memory (ROM) 2, and a random access memory (RAM) 3, and input and output peripherals 4.

The ROM 2 contains an operating system program OS, arranged to enable the computer system to be operated, and application programs AP, AP' arranged to perform tasks such as computations or other processing for delivering data that is then used outside the computer system. The various programs are loaded in the RAM 3 in order to enable them to be executed by the processor unit.

The operating system OS shares the resources of the computer system between the various programs being executed and manages the interchange of data between the various software and hardware components of the computer system 10. The operating system OS thus enables the processor unit 1 to be shared between the various tasks to be executed. In this example, this sharing is performed by sequencer that allocates time slots for accessing the processor unit to the various tasks to be executed. Such time slots are also referred to as "computation periods".

The sequencer is programmed to implement the method of the invention for managing task execution by the processor unit 1 of the computer system 10.

In accordance with the method of the invention, time-related execution characteristics are associated with each task.

The time-related execution characteristics include:
a flag indicating the possibility of the task being managed by the sequencer of the computer system 10 (the method of the invention has no effect on the tasks that are not managed by the sequencer);
a flag indicating the possibility of a theoretical time being determined a priori for start of execution;
a flag indicating the possibility of a theoretical time being determined a priori for end of execution of the task in nominal execution mode;
a flag indicating the possibility of an extended execution mode for continuing to execute the task beyond the theoretical end-of-execution time;
a flag indicating there is no run-time bound;
a flag indicating the possibility of interrupting execution of the task, the interruptible task continuing to be executed only if it has the highest priority of the tasks requesting execution; and
a flag indicating the possibility of modifying the time-related execution characteristics, this flag indicating the possibility of modifying the time-related, execution characteristics specifying whether this modification can be done by an element of the computer system or by some other task that is being executed (such modification making it possible, for example, to adapt the time-related execution characteristics to new operating conditions).

The time-related execution characteristics are, for example, coded in hexadecimal numbers, e.g. of four bits each.

By way of example, provision may be made for the time-related execution characteristics to comprise the number made up of the digits a, b, c, d that have values equal either to 0 or to 1 as indicated in the following table:

| a | b | c | d |
|---|---|---|---|
| 0 | Managed by the sequencer | Deterministic start time | Deterministic end time | Non-interruptible |

-continued

| a | b | c | d |
|---|---|---|---|
| 1 | Not managed by the sequencer | Non-deterministic start time | Non-deterministic end time | Interruptible |

The term "deterministic" is used to indicate that the theoretical start time or end time can be computed before launching execution of the task. Thus, all of the cyclic or semi-cyclic tasks have deterministic start times even if they are immediately preempted by a task of higher priority. Conversely, the non-cyclic tasks (execution of which is launched by other tasks or as a function of external elements) have non-deterministic start times.

In nominal operating mode, execution of the highest priority task is launched by the sequencer in a given computation period, and the task is finished in the computation period corresponding to the theoretical end-of-task time. The sequencer can then take over again and launch execution of the next highest priority task. Where necessary, if execution of the task is completed before the computation period corresponding to the theoretical end-of-task time, the task goes into an endless non-functional loop until the sequencer takes over again.

When a task is being executed at the theoretical end-of-execution time, various situations are then possible.

The time-related execution characteristics do not include any flag indicating the possibility of interruption: the execution of the task continues until it is finished.

The time-related execution characteristics do include a flag indicating the possibility of interruption but they do not include any flag indicating the possibility of determining, a priori, a theoretical end-of-execution time: the task is interrupted so as to launch execution of a higher priority task if there is such a task awaiting execution.

The time-related execution characteristics include a flag indicating the possibility of determining, a priori, a theoretical time for the end of execution of the task in nominal execution mode, but they do not include any flag indicating the possibility of an extended mode for execution of the task whereby its execution can be continued beyond the theoretical end-of-execution time: an error processing algorithm is launched by the sequencer.

The time-related execution characteristics include a flag indicating the possibility of determining, a priori, a theoretical time for the end of execution of the task in nominal execution mode, and a flag indicating the possibility of an extended mode for execution of the task whereby its execution can be continued beyond the theoretical end-of-execution time: the method includes a step of launching an execution continuation algorithm.

In a first implementation, the execution algorithm makes provision for the execution to be continued beyond the theoretical end time until the task is actually finished.

In a second implementation, the execution algorithm makes provision for the execution to be continued to a predetermined time, and for an error processing algorithm to be launched if the execution is not completed at said predetermined time. Said predetermined time is specific to each task, and is then preferably recorded in the time-related execution characteristics.

In a third implementation, the method includes a step of storing in a memory, for each task, the number of executions that have already been carried out in extended mode, and the execution algorithm makes provision for the execution to be continued in extended mode if the number of executions is less than a threshold. An error processing algorithm is launched if the number of executions has reached said threshold. The threshold is determined for each task by determining the number of times it is possible to execute almost the entire task without giving rise to a real time problem for the other tasks. In this example, the threshold is equal to the maximum number of times that activation of the task can be repeated without the successive executions of said task hindering execution of the other tasks.

Preferably, in this implementation, the threshold is taken from among the time-related execution characteristics of the task in question. This makes it possible to adapt the threshold to the task to be implemented, i.e. to its robustness, to its criticality, etc.

Also preferably in this implementation, the number of executions already carried out in extended mode for the task in question is reinitialized or decremented whenever a predetermined event occurs. For example, the predetermined event may be a full execution of said task before the theoretical end-of execution time, a re-boot of the computer system, a signal at an input of the computer system, etc.

In a fourth implementation, a plurality of extended-mode execution algorithms are provided, stored in a memory, for execution in extended mode, and the time-related execution characteristics include an identifier of one of the execution algorithms that is launched if the execution continues after the theoretical end-of-execution time.

By way of example, in this fourth implementation, provision is made for the execution algorithms of the first, second, and third implementations to be stored in the ROM 2, and for the data specific to each of the tasks that can be executed in extended mode to include an identifier of which algorithm is to be executed in extended mode.

Naturally, the invention is not limited to the implementations described but rather it encompasses any variant lying within the ambit of the invention as defined by the claims.

In particular, the method of the invention may be implemented using time-related execution characteristics other than those mentioned in the above description.

Other extended-mode execution algorithms may be devised as may other thresholds or parameters for such algorithms.

The invention claimed is:

1. A method of managing execution of tasks by at least one processor unit, a sequencer and a memory of a computer system, the processor unit operating unit operating in computation periods, and the method comprising the steps of:
   associating time-related execution characteristics with each task, the time-related execution characteristics including at least one of:
      a flag indicating, with a priori, a theoretical end-of-task time in a nominal execution mode; and
      a flag indicating an extended execution mode whereby execution of the task can continue beyond a theoretical end-of-execution time of the task;
   launching execution of a highest priority task by the sequencer in a given computation period in the nominal operation mode, the task being finished in the computation period corresponding to the theoretical end-of-task time; and
   launching an execution continuation algorithm to cause the sequencer to delay execution of a subsequent task until completion of the execution of the currently executed task if the time-related execution characteristics of the task includes the flag indicating, with a priori, the extended execution mode, or launching an error processing algorithm if the time-related execution characteristics of the task does not include the flag indicating, with a priori, the extended execution mode;
   storing, in the memory and for each task, a number of executions already carried out in the extended execution mode; and
   continuing the execution in the extended execution mode if the number of executions is less than a threshold and launching the error processing algorithm if said number of execution is not less than said threshold.

2. The method according to claim 1, wherein the execution algorithm makes provision for the execution to be continued beyond the theoretical end-of-task time until the task is actually finished.

3. The method according to claim 1, wherein the execution continuation algorithm makes provision for the execution to be continued to a predetermined time, and for an error processing algorithm to be launched if the execution is not completed at said predetermined time.

4. The method according to claim 1, wherein the threshold is taken from among the time-related execution characteristics.

5. The method according to claim 1, wherein the number of executions already carried out in the extended execution mode for at least one of the tasks is decremented or reinitialized if a predetermined event occurs.

6. The method according to claim 5, wherein the predetermined event is said task being fully executed before the theoretical end-of-execution time.

7. The method according to claim 1, wherein a plurality of execution algorithms are stored in the memory, for execution in the extended execution mode, and wherein the time-related execution characteristics include an identifier of one of the execution algorithms that is launched if the execution continues after the theoretical end-of-task time.

8. The method according to claim 1, wherein the time-related characteristics of at least one of the tasks includes a flag indicating there is no run-time bound, execution of said task being interruptible.

9. The method according to claim 1, wherein the time-related characteristics of at least one of the tasks includes a flag indicating there is no run-time bound, execution of said task not being interruptible.

10. The method according to claim 1, wherein the time-related execution characteristics of at least one of the tasks include a flag indicating the possibility of interruption of execution of said task and, with a priority being assigned to each task, the method further comprises a step of interrupting a task for which the time-related execution characteristics include a flag indicating the possibility of interruption for performing a higher-priority task.

11. The method according to claim 1, wherein the time-related execution characteristics of at least one of the tasks include a flag indicating the possibility of determining, a priori, a theoretical time for the start of execution.

12. The method according to claim 1, wherein the time-related execution characteristics of at least one of the tasks include a flag indicating whether or not to modify the time-related execution characteristics.

13. The method according to claim 1, wherein the indication of whether or not to modify the time-related execution characteristics specifies whether such modification can be done by an element of the computer system or by another task that is being executed.

14. The method according to claim 1, wherein the time-related execution characteristics of at least one of the tasks include a flag indicating whether or not to have the task managed by the sequencer of the computer system.

* * * * *